United States Patent
Saitoh

(10) Patent No.: US 6,906,774 B2
(45) Date of Patent: Jun. 14, 2005

(54) PACKAGING CASE-ENCASED ELECTRO-OPTICAL DEVICE AND PROJECTION TYPE DISPLAY DEVICE

(75) Inventor: Hiromi Saitoh, Chino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/606,777

(22) Filed: Jun. 27, 2003

(65) Prior Publication Data

US 2004/0036979 A1 Feb. 26, 2004

(30) Foreign Application Priority Data

Jul. 3, 2002 (JP) ........................................ 2002-195212

(51) Int. Cl.[7] ........................................... G02F 1/1339
(52) U.S. Cl. ....................................................... 349/153
(58) Field of Search ................................. 349/110, 111, 349/161, 158; 353/75

(56) References Cited

U.S. PATENT DOCUMENTS

| | | | | |
|---|---|---|---|---|
| 6,654,083 B1 | * | 11/2003 | Toda et al. | 349/110 |
| 6,762,808 B2 | * | 7/2004 | Bayrle et al. | 349/106 |
| 2003/0147036 A1 | * | 8/2003 | Kaise et al. | 349/161 |

* cited by examiner

Primary Examiner—James A. Dudek
(74) Attorney, Agent, or Firm—Oliff & Berridge, PLC

(57) ABSTRACT

A packaging case-encased electro-optical device includes: an electro-optical device where projection light from a light source enters an image display area, a dust-proof substrate disposed on a light incident plane or a light emitting plane thereof, a first light blocking film disposed thereon, a second light blocking film formed on an counter substrate configuring the electro-optical device, and a packaging case to house the electro-optical device and the dust-proof substrate. The second light blocking film, the first light blocking film, the dust-proof substrate and the packaging case configure a heat conducting path.

22 Claims, 12 Drawing Sheets

FIG. 11
(a)
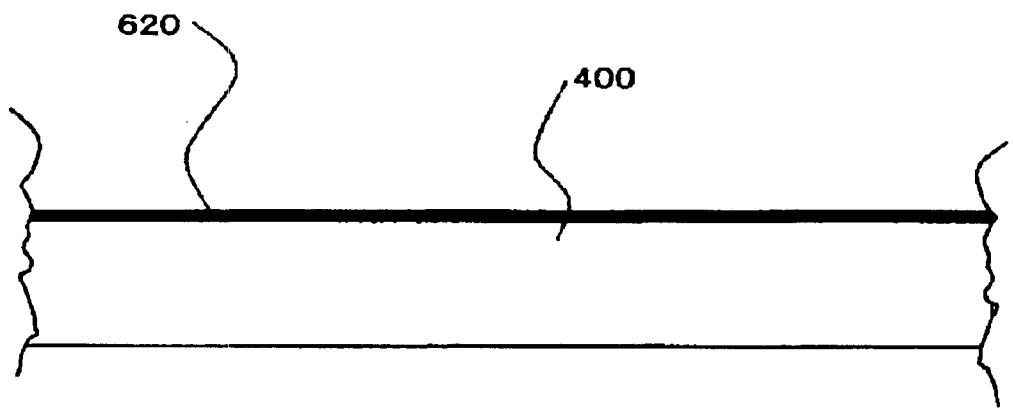
(b)
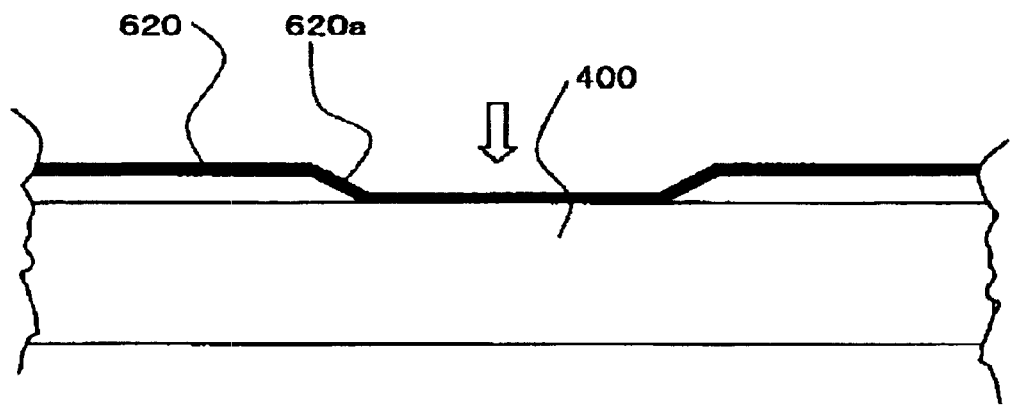
(c)
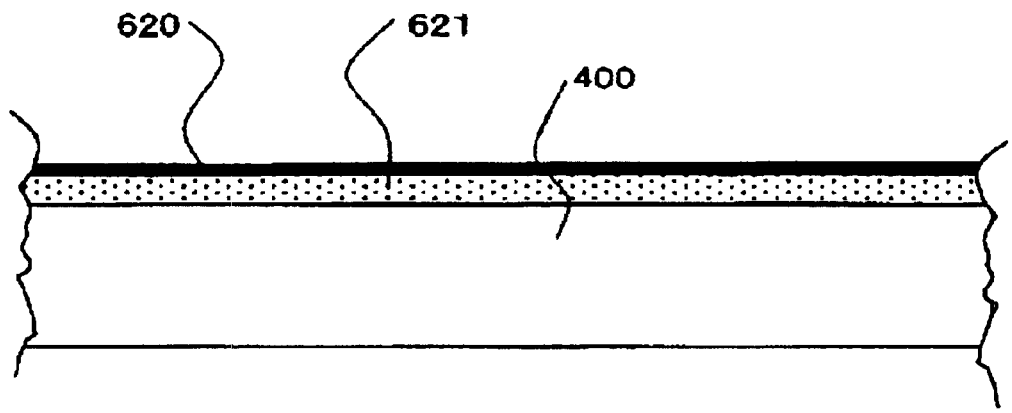

PACKAGING CASE-ENCASED ELECTRO-OPTICAL DEVICE AND PROJECTION TYPE DISPLAY DEVICE

BACKGROUND OF THE INVENTION

1. Field of Invention

The present invention relates to packaging cases that encase electro-optical devices, (hereinafter "packaging case-encased electro-optical device"), as well as the electro-optical devices themselves. In other words, the invention relates to an electro-optical device that is packaged or housed in a packaging case. Such electro-optical devices include liquid crystal panel used as a light valve for a projection type display device, such as a liquid crystal projector. The invention further relates to a projection type display device including the packaging case-encased electro-optical device.

2. Description of Related Art

Generally in the related art, when a liquid crystal panel is used as a light valve in a liquid crystal projector, high-intensity source light from a light source, such as a metal halide lamp, enters the liquid crystal panel in a gathered state to perform extended projection onto a screen. When the high-intensity source light enters in this manner, the temperature of the liquid crystal panel rises. The temperature of liquid crystals sandwiched between a pair of transparent substrates in the liquid crystal panel rises as well, which causes the property of the liquid crystals to be deteriorated. In addition, when the source light, particularly, has unevenness, the liquid crystal panel is partially heated to generate a so-called hot spot, and irregularities are generated in the transmittance of the liquid crystals to degrade the image quality of projected images. Such a temperature rise is relaxed more or less by disposing a heat ray cut filter between the light source and the liquid crystal panel to reduce unnecessary incidence of infrared rays, or by cooling the liquid crystal panel by air or liquid. However, to intend to form high quality images, more efficient schemes to reduce or prevent temperature rise are needed.

The related art has attempted to address or solve this problem via various schemes, including: to dispose a dust-proof glass on both sides or one side of the liquid crystal panel; to dispose a light blocking film over a substrate on the light incident side of the liquid crystal panel; and to form a packaging case made of a light reflective material, such that the packaging case has the liquid crystal panel packaged or housed therein. According to these schemes, the temperature rise in the liquid crystal panel can be reduced or suppressed properly. More specifically, when the dust-proof glass is disposed, it is expected to serve as a heat sink for the liquid crystal panel. The light blocking film and the packaging case formed of the light reflective material reduce or suppress the source light to excessively enter the liquid crystal panel, and thus the action of converting the light to heat can be reduced or suppressed inside the liquid crystal panel.

However, the above-described schemes to reduce or prevent the temperature rise in the liquid crystal panel are subject to the following problems. First, there are no perfect schemes to reduce or prevent the temperature rise in the liquid crystal panel in general. In other words, as long as the high-intensity light from the source light is projected, the problem of the temperature rise in the liquid crystal panel always inevitably exists. In order to enhance the image quality, the problem is always challenging. In short, the schemes to reduce or prevent the temperature rise in the liquid crystal panel are not satisfactory, and more effective schemes would be advantageous.

Furthermore, each of the above-described schemes to reduce or prevent the temperature rise are subject to disadvantages as described below. First, in the scheme to dispose the dust-proof glass, materials that could serve as the heat sink are generally expensive, causing increases in fabrication costs and product costs. Effectively reducing or preventing the temperature rise in the liquid crystal panel utilizing only this method is difficult.

Moreover, in the light reflection schemes by the light blocking film and the packaging case, the amount of light reflected is increased when their areas are expanded. Thus, the temperature rise in the liquid crystal panel can certainly be reduced or prevented. However, when the amount of light that is reflected is unnecessarily increased, the stray light in a housing to accommodate the packaging case-encased liquid crystal panel is increased, which can adversely affect the image quality. Besides, the amount of the source light that is supposed to enter and pass through the liquid crystal panel is to be reduced as the area of the light blocking film is expanded more and more, which can darken images. The above impedes bright images from being displayed with the use of high-intensity source light. As described above, the various schemes are also subject to a disadvantage in that they do not solve the problems drastically.

SUMMARY OF THE INVENTION

The invention addresses the above and/or other problems, and provides a packaging case-encased electro-optical device capable of efficiently reducing or suppressing temperature rise in an electro-optical device where relatively high-intensity projection light enters, and a projection type display device incorporating this packaging case-encased electro-optical device.

In order to address or solve the above, a packaging case-encased electro-optical device of the invention includes: an electro-optical device where projection light enters an image display area from a light source; a dust-proof substrate disposed on at least one of a light incident plane or a light emitting plane of the electro-optical device; a first light blocking film formed on the dust-proof substrate; a second light blocking film formed on at least one of a pair of substrates, one substrate placed on a light source side and the other substrate, configuring the electro-optical device; and a packaging case to hold at least a part of a peripheral area in a periphery of the image display area in the electro-optical device and housing the electro-optical device and the dust-proof substrate. The second light blocking film, the first light blocking film, the dust-proof substrate and the packaging case configure a heat conducting path.

According to the packaging case-encased electro-optical device of the invention, the electro-optical device where the projection light enters the image display area from the light source is housed or packaged in the packaging case along with the dust-proof substrate disposed on at least one of the light incident plane or the light emitting plane in the electro-optical device. As this electro-optical device, for example, a liquid crystal device or a liquid crystal panel disposed as a light valve in a projection type display device can be used.

The dust-proof substrate is disposed on at least one of the light incident plane or the light emitting plane, which prevents dust and dirt floating around the electro-optical device from directly attaching to the surface of the electro-optical device. Therefore, the deficiency that the image of dust and dirt is projected onto the image of extended projection can be reduced or eliminated effectively. This is because the dust-proof substrate has a predetermined thickness and serves as the defocus effect to shift the focal point or the proximity of the focal point of the source light away from the position of the dust and dirt, that is, from the surface of the dust-proof substrate. In addition, the packaging case holds at least a part of the peripheral area of the electro-optical device. The "packaging case" in this application means a case-shaped member for at least partially housing the electro-optical device or for at least partially holding the perimeter of the electro-optical device. Generally, it is a broad concept including members called "packaging case" or simply "case", or "packaging frame" or simply "frame", or a metal hook for fixing the electro-optical device to this case-shaped member (however, see the below description of "hook"). Furthermore, it is acceptable to provide this packaging case with a light blocking effect that the peripheral area of the electro-optical device is at least partially covered to reduce or prevent the light leakage in the peripheral area, or to reduce or prevent stray light from entering the image display area from the peripheral area.

In operating the electro-optical device, the projection light is irradiated onto the image display area from the light source, and then the projection light enters and increases the temperature of the electro-optical device. Consequently, if no schemes are taken, then the temperature of the electro-optical device rises to cause various disadvantages similarly as the related art.

However in the invention, as described in the Background of the Invention section of this application, the dust-proof substrate, the light blocking film and the packaging case are provided first, and thus the temperature rise in the electro-optical device can be prevented according to these various configurations. More specifically, the dust-proof substrate functions as a heat sink for the electro-optical device, and the first light blocking film, the second light blocking film and the packaging case reduce or prevent the source light from excessively entering the electro-optical device and reduce or suppress the action of converting light to heat in the electro-optical device.

In addition to this, in the invention, the second light blocking film, the first light blocking film, the dust-proof substrate and the packaging case configure the heat conducting path. On this account, the heat inside the electro-optical device is efficiently conducted along the route from the second light blocking film to the packaging case, and finally dissipated outside. More specifically, the second light blocking film accumulates the heat inside the electro-optical device to some extent, the first light blocking film receives and transfers the heat to the dust-proof substrate, and then the heat is conducted to the packaging case contacting with outside air.

In this manner, in the invention, the individual effects to reduce or prevent the temperature rise in the electro-optical device can also be exerted based on the existence of the separate components of the dust-proof substrate, the light blocking film or the packaging case. In addition to this, they combine and relate to each other, and the separate components form the heat conducting path. Therefore, the advantage of reducing or preventing the temperature rise in the electro-optical device can be exerted beyond the effect and advantage by simple combinations.

As described above, according to the packaging case-encased electro-optical device of the invention, the temperature rise in the electro-optical device can be reduced or suppressed efficiently. The electro-optical device is used as the light valve for the projection type display device onto which the high-intensity projection light is projected, for example.

In one exemplary embodiment of the packaging case-encased electro-optical device of the invention, at least two of the second light blocking film, the first light blocking film, the dust-proof substrate and the packaging case contact each other.

According to this exemplary embodiment, at least two of the separate components configuring the heat conducting path contact each other. Therefore, the heat is conducted more efficiently as described above, and the reduction of or prevention of the temperature rise in the electro-optical device can be achieved more effectively. In addition, particularly as a preferable example of "at least two", the first light blocking film and the packaging case can be used. According to this combination, the first light blocking film on the dust-proof substrate directly receiving incoming light is brought into contact with the packaging case having the greatest thermal capacity among the separate components. Thus, it can be expected to effectively exert the effect to reduce or prevent the temperature rise in the electro-optical device.

Particularly in this exemplary embodiment, it is preferable that the first light blocking film and the packaging case contact each other.

According to this configuration, the first light blocking film on the dust-proof substrate directly receiving incoming light is brought into contact with the packaging case having the greatest thermal capacity among the separate components, as described above. Therefore, it can be expected to effectively exert the effect to reduce or prevent the temperature rise in the electro-optical device.

Furthermore, as the combination of the components "to contact each other", in addition to the above, it is acceptable that the dust-proof substrate and the packaging case contact each other, and at least one of the first light blocking film, and the second light blocking film, and the packaging case contact each other.

According to this configuration, first, the dust-proof substrate having a relatively greater thermal capacity and the packaging case having the greatest thermal capacity among the separate components contact each other, as described above. Therefore, the temperature rise in the electro-optical device can be reduced or prevented. Further in the configuration, at least one of the first light blocking film, and the second light blocking film, and the packaging case contact each other. Thus, the temperature rise in the electro-optical device can be reduced or prevented more effectively. The contact of the first light blocking film with the packaging case each other is described as above. Moreover, according to the contact of the second light blocking film with the packaging case each other, the second light blocking film is placed in the relatively back part of the electro-optical device, which is a component that most accumulates the heat inside. Therefore, when the packaging case is contacted with the second light blocking film so as to absorb heat therefrom, it can be expected to effectively exert the effect to prevent the temperature rise in the electro-optical device.

In another exemplary embodiment of the packaging case-encased electro-optical device of the invention, the packaging case is formed of a material containing magnesium or aluminum.

According to this exemplary embodiment, the packaging case is formed of the material containing magnesium or aluminum having a relatively greater thermal conductivity. Thus, the role of the packaging case configuring a part of the heat conducting path can be enhanced dramatically. In addition, when the packaging case is formed of these materials, the effect to reflect the source light can be sufficiently exerted, which also allows the reduction or prevention of the temperature rise in the electro-optical device.

In addition, the inventor confirms that the degree of the temperature rise in the electro-optical device can be reduced or suppressed by about 12° C. as compared with related art, according to the form that combines the configuration of this exemplary embodiment and the configuration of forming the second light blocking film (described later) of aluminum.

In the other exemplary embodiment of the packaging case-encased electro-optical device of the invention, the dust-proof substrate is formed of sapphire.

According to this exemplary embodiment, the dust-proof substrate is formed of sapphire having a relatively greater thermal conductivity. Thus, the role of the dust-proof substrate configuring a part of the above-described heat conducting path can be enhanced dramatically. However in the invention, other than the dust-proof substrate being formed of sapphire, the cases that it is formed of more typical materials, such as silica and neoceram are not excluded.

In the other exemplary embodiment of the packaging case-encased electro-optical device of the invention, an end face light blocking film is further formed on an end face of the dust-proof substrate so as to be joined to the first light blocking film.

According to this exemplary embodiment, it can be expected to enhance the role of the first light blocking film as the heat conducting path. Furthermore, when the configuration is adopted that the end face light blocking film is contacted with the packaging case, the degree of enhancing the role can be made greater. Moreover, on this account, for example, when it is hard to realize the first light blocking film to be contacted with the packaging case and it is rather easier to contact the end face light blocking film with the packaging case, the former configuration is not necessarily adopted because the latter configuration can be adopted. Therefore, flexibility in design can be enhanced.

Then, particularly in this exemplary embodiment, it is preferable that a backside light blocking film is further formed on a surface of the dust-proof substrate where the first light blocking film is not formed, so as to be joined to the first light blocking film and the end face light blocking film.

According to this configuration, it can be expected to enhance the role of the first light blocking film as the heat conducting path. In addition, when the configuration is adopted that the backside light blocking film is contacted with the packaging case, the degree of enhancing the role can be made greater.

Furthermore, on this account, for example, when it is hard to realize the first light blocking film to be contacted with the packaging case or the end face light blocking film to be contacted with the packaging case, and it is rather easier to realize the backside light blocking film to be contacted with the packaging case, the former two configurations are not necessarily adopted because the latter configuration can be adopted. Therefore, flexibility in design can be enhanced.

In the other exemplary embodiment of the packaging case-encased electro-optical device of the invention, the first light blocking film is formed of aluminum.

According to this exemplary embodiment, the light reflection performance of the first light blocking film can be exerted sufficiently, and thus the temperature rise in the electro-optical device can be further reduced or suppressed. In addition, in this case, it is of course acceptable that the end face light blocking film and the backside light blocking film are formed of aluminum as well.

Particularly in this form, it is acceptable that the first light blocking film has a multilayer structure having a layer formed of aluminum on the light source side and a layer formed of oxide film on the opposite side thereof.

According to this configuration, for example, the light having reached the opposite side of the dust-proof substrate as seen from the light source is reflected on the backside of the first light blocking film, that is, on the surface on the opposite side of the surface on the light source side. Thus, the generation of the stray light can be reduced or suppressed inside the electro-optical device. Hereafter, it is the same in regard to the "first light blocking film" and the "second light blocking film".

Furthermore, as the "oxide film", in addition to one preferable form that it contains a chromina film, which is described below, the configuration is acceptable that it contains an alumina ($Al_2O_3$) film obtained by oxidizing the layer formed of aluminum on the light source side.

Further in this form, it is acceptable that the oxide film contains a chromina ($Cr_2O_3$) film. According to this configuration, the effect and advantage to reduce or suppress the reflection of unnecessary light in the backside of the first light blocking film described above can be exerted more effectively.

In the other exemplary embodiment of the packaging case-encased electro-optical device of the invention, the second light blocking film is formed of aluminum.

According to this exemplary embodiment, the light reflection performance of the second light blocking film can be exerted sufficiently, and the temperature rise in the electro-optical device can be further reduced or suppressed.

Moreover, when the second light blocking film is configured to contain aluminum, the thickness can be made thinner, whereas a light blocking film formed of chromium, for example, requires a thickness of at least 120 to 140 nm to secure the OD (Optical Density) value. More specifically, the thickness of the second light blocking film in this form can be about 95 nm. Even though this is done, a sufficient OD value can be secured.

In addition, according to this exemplary embodiment, because such the thin film can be formed, the rubbing process for an alignment layer generally formed on the second light blocking film can be performed preferably. More specifically, bumps and dips in the surface of the alignment layer are formed to be smoother by the amount that the second light blocking film is made thinner, and a so-called "shadow portion," where the end of hair of buffing cloth does not reach, is not generated. Therefore, the probability to generate irregularities in the aligned state of liquid crystal molecules, which is one example of electro-optical materials, is reduced, and a higher quality image can be displayed.

Particularly in this form, it is fine that the second light blocking film has a multilayer structure having a layer formed of aluminum on the light source side and a layer formed of chromium or chromina ($Cr_2O_3$) on the opposite side thereof.

According to this configuration, for example, the light having reached the inside of the electro-optical device is reflected on the backside of the second light blocking film, and thus the generation of the stray light can be reduced or suppressed inside the electro-optical device.

In the other exemplary embodiment of the packaging case-encased electro-optical device of the invention, at least one of the first light blocking film and the second light blocking film is formed in a grid shape as viewed in plan view.

According to this form, at least one of the first light blocking film and the second light blocking film is formed in the grid shape. That is, the areas of the light blocking films as seen in plane are relatively increased. Therefore, the light reflection effect can be exerted more effectively, and the temperature rise in the electro-optical device can be reduced or prevented. In addition, it can be considered that the heat absorbing effect is enhanced when the light blocking films are formed in the grid shape. Thus, the function as the heat conducting path, more specifically, for example, the effect of absorbing heat from the electro-optical device is reinforced. Furthermore, according to this form, the shape of the light blocking films is the grid shape despite the effect and advantage to be obtained. Therefore, the light blocking films simply exert a preferable effect to prevent light mixture between pixels in the image display area, which will not cause a preposterous event such that images are darkened.

In the other exemplary embodiment of the packaging case-encased electro-optical device of the invention, it further has a sealing material interposed between the pair of substrates configuring the electro-optical device for bonding the pair of substrates. A shape of the second light blocking film includes a closed curve along a perimeter of the substrate placed on the light source side, a shape of the first light blocking film is a closed curve along a perimeter of the dust-proof substrate, the closed curve includes a shape surrounding the second light blocking film, and the sealing material is formed so as to be covered with the first light blocking film as viewed in plan view.

According to this exemplary embodiment, the shapes of the first light blocking film and the second light blocking film include the closed curves along the perimeters of the dust-proof substrate and the substrate, respectively. Here, the "closed curve" is a set of line segments shaping the outline of a rectangular nearly analogue to the rectangular when the dust-proof substrate and the substrate are the rectangular, for example. In short, in this exemplary embodiment, the first light blocking film and the second light blocking film are formed to include the shapes that surround and rim the perimeters of the dust-proof substrate and the substrate. Moreover, the "curve" means to also include the case where a substrate has an irregular shape, not a regular shape such as a rectangular and square.

Then, particularly in this exemplary embodiment, the pair of substrates configuring the electro-optical device is bonded to each other with the sealing material, and the first light blocking film is formed so as to surround the second light blocking film. Here, as for "to surround", the case can be typically considered that the closed curve in the first light blocking film has the nearly analogue relationship with that in the second light blocking film, and the area surrounded by the former is greater than that of the latter. On this account, when the dust-proof substrate is combined with the electro-optical device and they are viewed in plan view, both the first light blocking film and the second light blocking film can be visibly recognized. In other words, the case is not observed as both fully overlaying each other, and only the first light blocking film or the second light blocking film is viewed.

In addition to this, further in this exemplary embodiment, the sealing material is formed so as to be covered with the first light blocking film as viewed in plan view. More specifically, the sealing material and the first light blocking film are formed so as to overlap each other as viewed in plan view. Furthermore, when only the electro-optical device where the dust-proof substrate is not bonded is viewed in plan view, the sealing material is formed so as to surround the outer periphery of the shape of the second light blocking film.

Accordingly, even though the sealing material contains a photo-curable resin and the curing process needs to be performed by irradiating light from the light source side of the substrate, the light for the curing process easily reaches the sealing material without being blocked by the second light blocking film. In this manner, according to this exemplary embodiment, the curing process for the sealing material can be performed without troubles in the first place.

Additionally, further in this exemplary embodiment, after the curing process for the sealing material is completed, the dust-proof substrate is bonded to the electro-optical device, and then the first light blocking film is disposed so as to conceal the sealing material. More specifically, the second light blocking film is formed relatively smaller beforehand in order to effectively perform the curing process for the sealing material. However, consequently, the portion not covered with the light blocking film, that is, the area to form the sealing material is to be covered with the first light blocking film. Therefore, as a whole, the area of the light blocking film is increased. In short, according to this exemplary embodiment, even though the second light blocking film is formed relatively smaller, the cooperative reflection effect of the first light blocking film and the second light blocking film can be obtained eventually, thus the effect to reduce or prevent the temperature rise in the electro-optical device will not be adversely affected.

In this exemplary embodiment, it is acceptable that the first light blocking film and the second light blocking film are formed so as to partially overlap each other as viewed in plan view.

According to this configuration, for example, the inner rim of the first light blocking film and the outer rim of the second light blocking film partially overlap each other in the state that the dust-proof substrate is bonded to the electro-optical device, as described above. More specifically, the incident light does not unnecessarily reach the inside of the electro-optical device when viewed from the light source side, and the event of generating the stray light inside thereof can be reduced or avoided as much as possible.

In addition, the exemplary embodiment is described above that the second light blocking film is formed relatively smaller and the first light blocking film is formed relatively greater so as to surround the second light blocking film. However, generally speaking relative to the invention, the light blocking films do not necessarily need to have such a relationship.

For example, the shapes of the first light blocking film and the second light blocking film contain the closed curves as similar to the above, but it is acceptable that the light blocking films are formed so that the latter shape is formed greater as if to "include" the former, not the former to include the latter. More specifically, in this case, the size of the shape of the second light blocking film is greater than that of the first light blocking film, and there is the portion that the first light blocking film is fully covered with the second light blocking film along the direction orthogonal to the surface of the dust-proof substrate or to the substrate surface of the electro-optical device. Consequently, the shape of forming double reflective layers appears. Accordingly, the reflection effect can be reinforced, and thus the temperature rise in the electro-optical device can be reduced or prevented.

However in this case, when only the electro-optical device is viewed in plan view, it is considered that the sealing material cannot be viewed therethrough anymore. However, even in this case, when the sealing material is formed of only a thermosetting resin, it can undergo the curing process, which is not a crucial problem.

In the other exemplary embodiment of the packaging case-encased electro-optical device of the invention, it further has a hook to keep the electro-optical device fixed to the packaging case. The hook configures a part of the heat conducting path.

According to this exemplary embodiment, the hook configures a part of the heat conducting path; at least a part of the hook is inevitably contacted with the electro-optical device and the packaging case in order to keep them fixed to each other. Therefore, the heat conduction from the electro-optical device to the packaging case takes the form that is realized through a plurality of paths in a kind. Consequently, heat is conducted and dissipated more surely. Accordingly, the temperature rise in the electro-optical device can be reduced or prevented more effectively.

Particularly in this exemplary embodiment, it is preferable that the hook is formed of phosphor bronze.

According to this configuration, the hook is formed of phosphor bronze having a relatively greater thermal conductivity. Therefore, the role of the hook configuring a part of the heat conducting path can be enhanced dramatically.

In the other exemplary embodiment of the packaging case-encased electro-optical device of the invention, it further has an intermediate layer disposed between the dust-proof substrate and the packaging case. The intermediate layer configures a part of the heat conducting path.

According to this exemplary embodiment, the specific heat conducting path is newly added to configure "the heat conducting path" in the invention. Therefore, the temperature rise in the electro-optical device can be reduced or prevented more effectively.

A projection type display device of the invention includes: a packaging case-encased electro-optical device of the invention; a light source; an optical system to guide projection light to the electro-optical device; and a projection optical system to project the projection light emitted from the electro-optical device to solve or address the above mentioned problems.

The projection type display device of the invention includes the packaging case-encased electro-optical device of the invention. Thus, heat is dissipated efficiently through the heat conducting path from the electro-optical device to the packaging case. Therefore, the temperature rise in the electro-optical device used as the light valve can be reduced or suppressed efficiently. Accordingly, the deterioration of an electro-optical material, such as liquid crystals due to heat, is reduced, and the degradation of display images caused by the total or partial temperature rise in the electro-optical material can be reduced or prevented effectively. Finally, high quality image display is feasible.

The effect and advantage of the invention will be apparent from following exemplary embodiments.

BRIEF DESCRIPTION OF THE DRAWINGS

FIGS. 11(a) to 11(c) are enlarged cross-sectional views illustrating a portion inside a circle denoted by sign Q shown in FIG. 7, where FIG. 11(a) is a form that a hook part is thoroughly contacted with a dust-proof substrate, FIG. 11(b) is a form that they partially contact each other, and FIG. 11(c) is a form that they do not contact each other directly;

DETAILED DESCRIPTION OF PREFERRED EMBODIMENTS

Exemplary embodiments of the invention are described below based on the drawings.
(Exemplary Embodiment of a Projection Type Liquid Crystal Device)

First, an exemplary embodiment of a projection type liquid crystal device according to the invention is described below with reference to FIG. 1, with a focus on an optical system integrated in an optical unit thereof. The projection type display device of the exemplary embodiment is configured as an integrated color projector having three liquid crystal light valves used therein, which is one example of a packaging case-encased electro-optical device.

Figure 1:
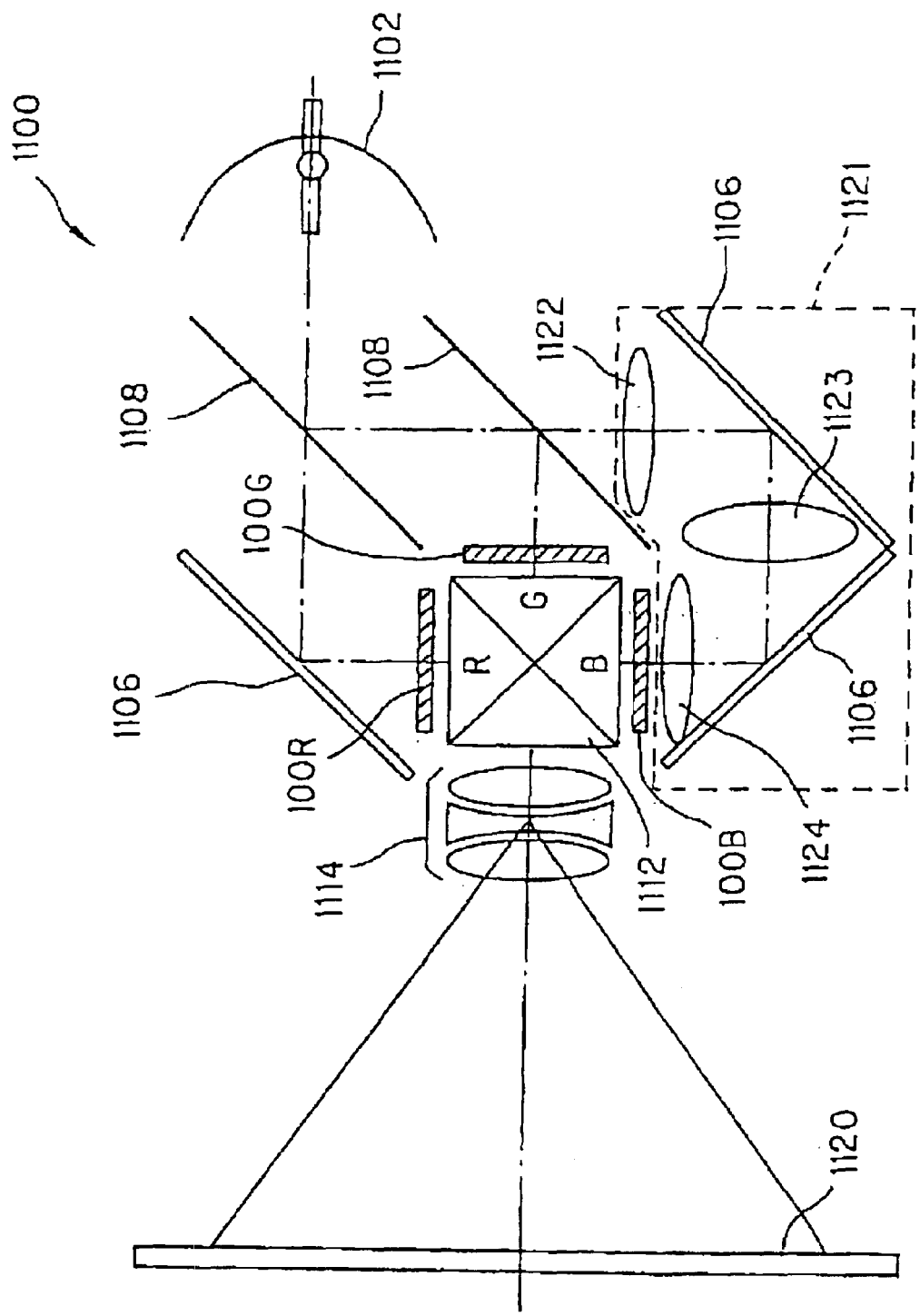
FIG. 1 is a plan view illustrating an exemplary embodiment of a projection type liquid crystal device in the invention.

In FIG. 1, a liquid crystal projector 1100, which is one example of the integrated color projector in the exemplary embodiment, is configured as a projector in which three liquid crystal light valves including an electro-optical device having a drive circuit mounted on a TFT array substrate are prepared and used as light valves 100R, 100G and 100B for red, green and blue, respectively.

In the liquid crystal projector 1100, projection light is emitted from a lamp unit 1102 of a white light source, such as a metal halide lamp, it is separated into optic elements R, G, B, corresponding to the three primary colors, red, green and blue by three mirrors 1106 and two dichroic mirrors 1108, and then they are guided to the corresponding light valves 100R, 100G and 100B, respectively. At this time, blue light is particularly guided through a relay lens system 1121 formed of an incoming lens 1122, a relay lens 1123 and an emitting lens 1124 in order to reduce or prevent optical loss due to a long optical path. Subsequently, the optic elements corresponding to the three primary colors modulated by the light valves 100R, 100G and 100B are again combined by a dichroic prism 1112, and then they are projected onto a screen 1120 as a color image through a projector lens 1114.

As the light valves 100R, 100G and 100B of the exemplary embodiment, for example, a liquid crystal device of an active matrix drive system using TFTs as a switching device is used, which is described below.

In the configuration described above, temperature rises in the light valves 100R, 100G and 100B due to the projection light from the lamp unit 1102 to be a high-intensity light source.

At this time, when the temperature rises excessively, liquid crystals configuring the light valves 100R, 100G and 100B are deteriorated, or the unevenness in the source light causes the liquid crystal panels to be partially heated and then a hot spot occurs to generate irregularities in the transmittance rate. Then, particularly in the exemplary embodiment, each of the separate light valves 100R, 100G and 100B is provided with a dust-proof substrate of the invention, which is described below, packaged in a packaging case, and mounted in a housing of the projection type liquid crystal device 1100. On this account, the temperature rise in the light valves 100R, 100G and 100B is efficiently reduced or suppressed, as described later.

In addition, preferably in the exemplary embodiment, a cooling unit formed of a blower fan to blow air and a circulation system to circulate a cooling medium is provided in the space around the light valves 100R, 100G and 100B inside the housing of the projection type liquid crystal device 1100. Accordingly, the heat dissipation from the packaging case-encased electro-optical device having a heat dissipating effect, which is described below, can be performed efficiently.

(Exemplary Embodiment of an Electro-Optical Device)

Figure 2:
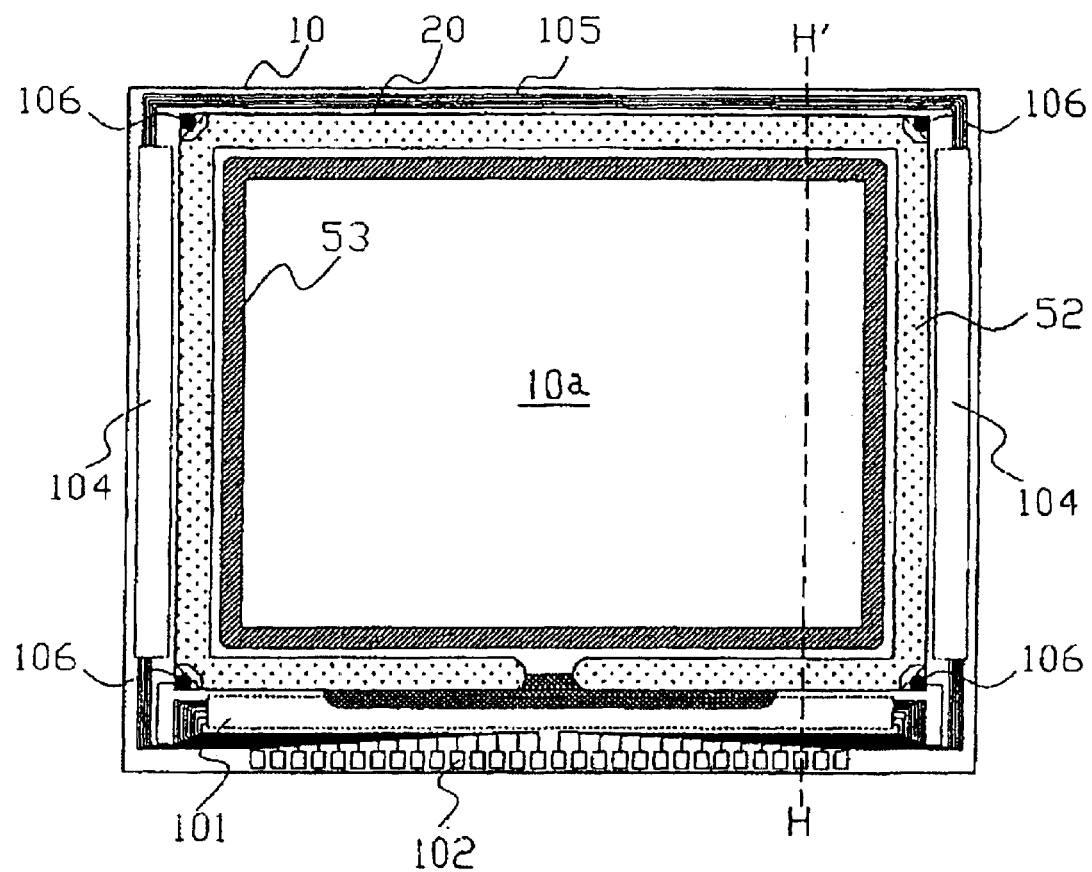
FIG. 2 is a plan view illustrating an exemplary embodiment of a liquid crystal panel in the invention.
Figure 3:
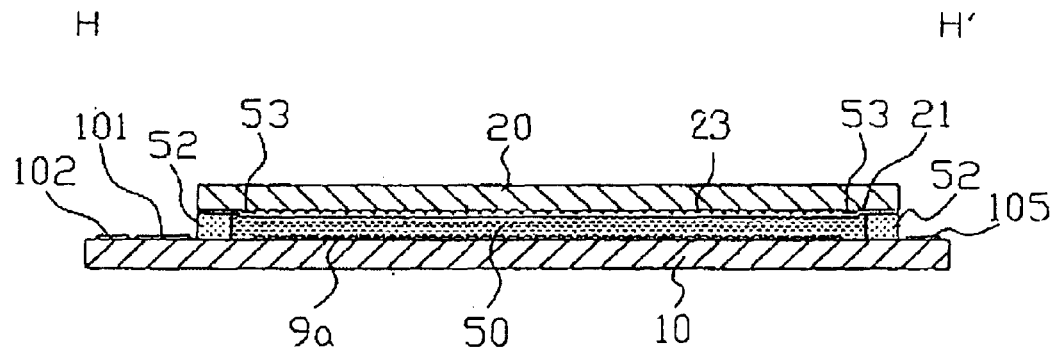
FIG. 3 is a cross-sectional view taken along plane H–' shown in FIG. 2.

Next, the overall configuration of an exemplary embodiment of the electro-optical device of the invention is described below with reference to FIGS. 2 and 3. A liquid crystal device of a drive circuit integrated TFT active matrix drive system is exemplified, which is one example of the electro-optical device. The electro-optical device in the exemplary embodiment is used as the liquid crystal light valves 100R, 100G and 100B in the liquid crystal projector 1100. FIG. 2 is a plan view illustrating an electro-optical device as seen from the counter substrate side along with a TFT array substrate having separate components formed thereon. FIG. 3 is a cross-sectional view taken along plane H–H' shown in FIG. 1.

In FIGS. 2 and 3, in the electro-optical device in the exemplary embodiment, a TFT array substrate 10 is faced to an counter substrate 20. A liquid crystal layer 50 is sealed between the TFT array substrate 10 and the counter substrate 20. The TFT array substrate 10 and the counter substrate 20 are sealed to each other with a sealing material 52 disposed in a sealing area lying around an image display area 10a.

The sealing material 52 is formed of a UV curable resin and a thermosetting resin to bond both substrates to each other, for example, which is applied on the TFT array substrate 10 and then cured by ultraviolet radiation and heating in the fabrication processes. In addition, gap materials, such as glass fibers or glass beads to set a space between the TFT array substrate 10 and the counter substrate 20, that is, a gap between the substrates to have a predetermined value are dispersed in the sealing material 52. More specifically, the electro-optical device of the exemplary embodiment is small in size and suitable to zoom display as the light valves for projectors.

In parallel with the inner side of the sealing area where the sealing material 52 is disposed, a frame light blocking film 53, which is one example of a second light blocking film with the light blocking effect of the invention for defining a frame area of the image display area 10a, is disposed on the counter substrate 20 side. However, it is acceptable that a part of or all the frame light blocking film 53 is disposed on the TFT array substrate 10 side as an integral light blocking film.

In the area extending around the periphery of the image display area, a data line drive circuit 101 and external circuit connecting terminals 102 are disposed along one side of the TFT array substrate 10 and scan line drive circuits 104 are disposed along two sides adjacent to this side in the peripheral area lying around the outer side of the sealing area disposed with the sealing material 52. Furthermore, along the remaining side of the TFT array substrate 10, a plurality of wiring lines 105 to connect between the scan line drive circuits 104 disposed along both sides of the image display area 10a is disposed. Moreover, as shown in FIG. 2, at four corner parts of the counter substrate 20, conducting materials 106 functioning as conducting terminals between both substrates are disposed. On the other hand, in the areas facing to these corners in the TFT array substrate 10, conducting terminals are disposed. Accordingly, the TFT array substrate 10 can be electrically conducted to the counter substrate 20.

In FIG. 3, over the TFT array substrate 10, an alignment layer is formed over a pixel electrode 9a after pixel switching TFTs and wiring lines, such as scan lines and data lines, are formed. On the other hand, over the counter substrate 20, an alignment layer is formed over the top layer part in addition to a counter electrode 21. The liquid crystal layer 50 is formed of liquid crystals mixed with one kind or several kinds of nematic liquid crystals, for example, and it takes a predetermined aligned state between the pair of alignment layers.

Furthermore, over the TFT array substrate 10 shown in FIGS. 2 and 3, it is acceptable to form a sampling circuit to sample image signals on image signal line to feed them to the data lines, a precharge circuit to feed precharge signals at a level of a predetermined voltage to a plurality of data lines prior to the image signals, and a test circuit to test the quality and defects of the electro-optical device in fabrication and shipping, in addition to the data line drive circuit 101 and the scan line drive circuits 104.

In the case of the electro-optical device thus configured, high-intensity projection light is irradiated from the upper side of FIG. 3 during operation. Then, heat generation due to the light absorption in the counter substrate 20, the liquid crystal layer 50 and the TFT array substrate 10 causes the temperature of the electro-optical device to rise. This temperature rise accelerates the deterioration of the liquid crystal layer 50 and causes the quality of display images to be degraded.

Then, particularly in the exemplary embodiment, this temperature rise in the electro-optical device is reduced or suppressed efficiently according to various exemplary embodiments, which will be described below.

(First Exemplary Embodiment of the Packaging Case-Encased Electro-Optical Device Having the Effect to Reduce or Prevent Temperature Rise)

A first exemplary embodiment of the packaging case-encased electro-optical device in the invention is described below with reference to FIGS. 4 to 9.

Figure 4:
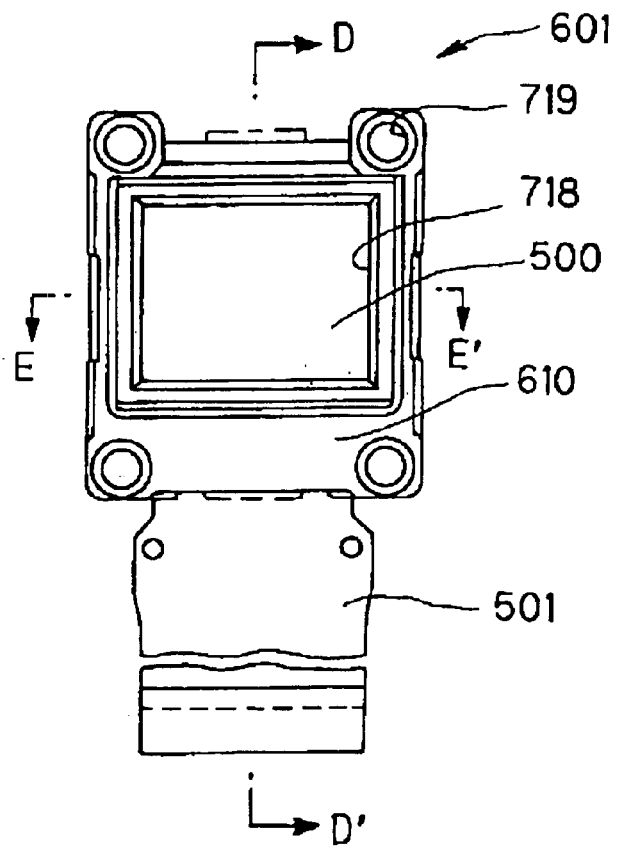
FIG. 4 is a front view illustrating a first exemplary embodiment of a packaging case in the invention.
Figure 5:
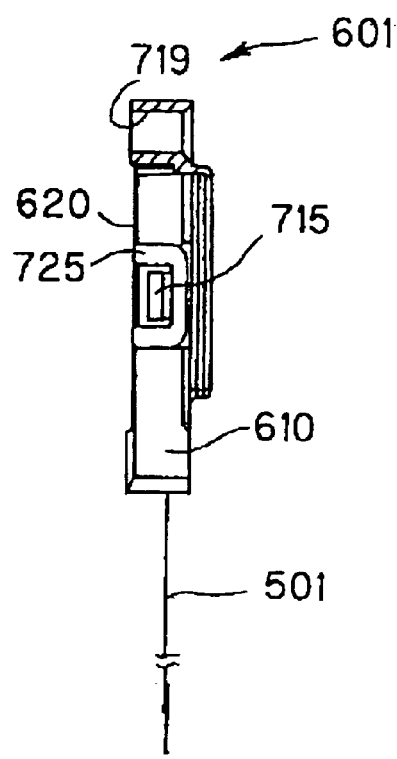
FIG. 5 is a side view illustrating the first exemplary embodiment of the packaging case in the invention.
Figure 6:
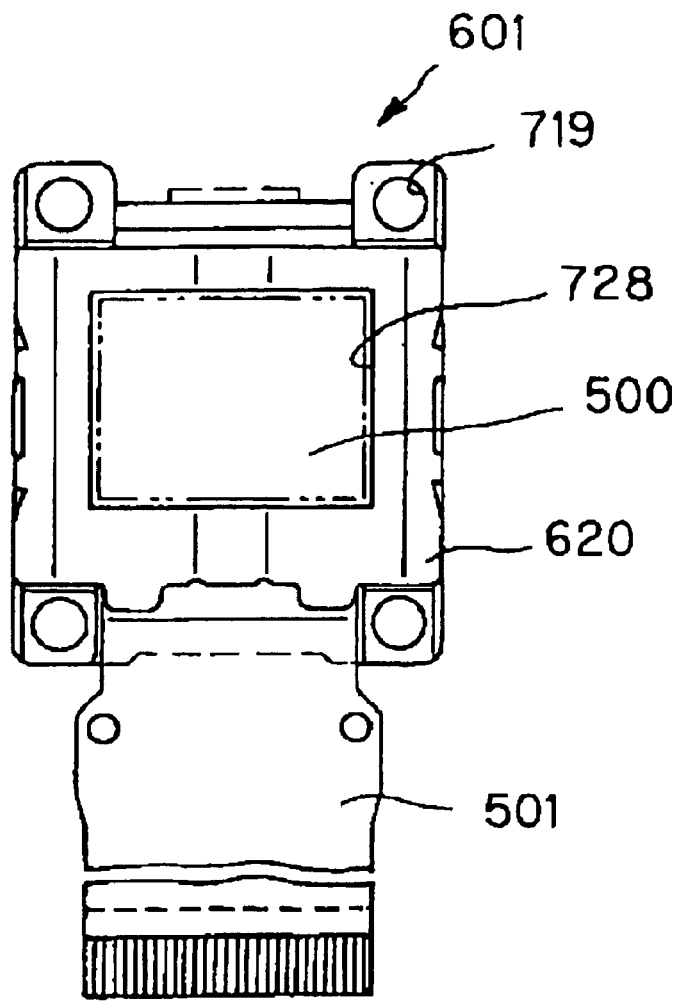
FIG. 6 is a rear view illustrating the first exemplary embodiment of the packaging case in the invention.
Figure 7:
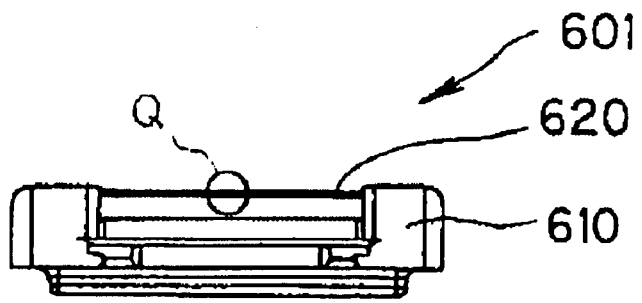
FIG. 7 is a top view illustrating the first exemplary embodiment of the packaging case in the invention.
Figure 8:
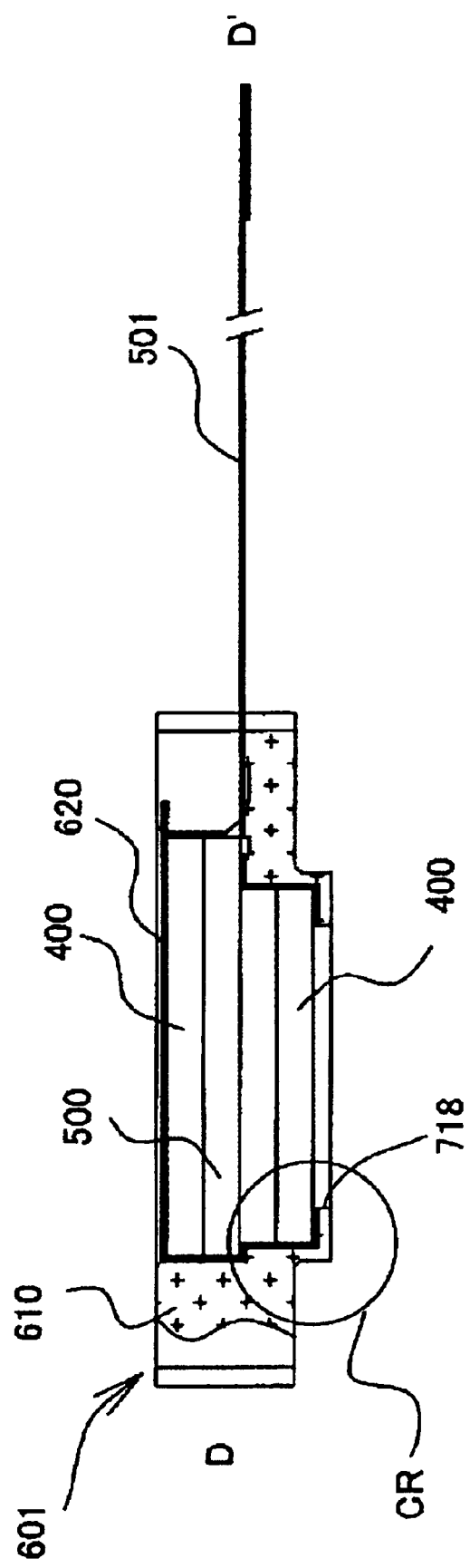
FIG. 8 is a cross-sectional view taken along plane D–D' shown in FIG. 4.

The basic configuration of the packaging case in the exemplary embodiment is first described with reference to FIGS. 4 to 8. FIG. 4 is a front view illustrating a packaging case. FIG. 5 is a side view thereof. FIG. 6 is a rear view thereof. FIG. 7 is a top view thereof. FIG. 8 is a cross-sectional view taken along plane D-D' shown in FIG. 4. In addition, FIGS. 4 to 8 illustrate the packaging case in the state that an electro-optical panel is housed inside.

As shown in FIGS. 4 to 8, a packaging case 601 is provided with a frame part 610 and a hook part 620. An electro-optical panel 500 housed in the packaging case 601 has the electro-optical device shown in FIGS. 2 and 3 and other optical components including an anti-reflection plate overlaid with the surface thereof, and a flexible connector 501 is further connected to an external circuit connecting terminal thereof. In addition, it is acceptable that a polarizing plate and a retardation plate are disposed in the optical system of the projection type display device and alternatively they are overlaid with the surface of the electro-optical panel 500.

Particularly in the first exemplary embodiment, dust-proof substrates 400 are disposed on the sides of the TFT array substrate 10 and the counter substrate 20, which do not face to the liquid crystal layer 50 (see FIG. 8). The dust-proof substrate 400 is configured to have a predetermined thickness. Therefore, dust and dirt floating around the electro-optical panel 500 are reduced or prevented from directly attaching to the surface of the electro-optical device. Accordingly, the deficiency that the image of dust and dirt is projected onto the image of extended projection can be reduced or eliminated effectively. This is because the dust-proof substrate 400 has a predetermined thickness and serves as the defocus effect to shift the focal point of the source light or the proximity thereof away from the position of dust and dirt, that is, from the surface the dust-proof substrate 400.

The frame part 610 is preferably formed of a light blocking resin and a metal so as to reduce or prevent light leakage in the peripheral area of the electro-optical panel and to reduce or prevent stray light from entering the image display area from the peripheral area. More preferably in the first exemplary embodiment, the frame part 610 is formed of a material containing aluminum or magnesium. Therefore, the heat conduction effect in the frame part 610 is to be enhanced. The frame part 610 has a main body to define the internal space to house the electro-optical panel 500 therein, and further has a window 718 opened in the main body so as to expose the image display area of the electro-optical panel 500. The frame part 610 has mounting holes 719 at four corners so as to mount the packaging case-encased electro-optical device inside the projection type display device shown in FIG. 1.

The hook part 620 has a plate-shaped main body having a plane faced to the peripheral area of the electro-optical panel 500 housed in the internal space of the frame part 610 for fixing the peripheral area of the electro-optical panel 500 from the rear. The hook part 620 has a window 728 so as to expose the image display area of the electro-optical panel 500, and further has engaging parts 725 with a small window on both sides in the front for fixing the main body of the hook part 620 to the frame part 610. The frame part 610 further has a projecting part 715 to be engaged with the small window of the engaging part 725 on both sides in the front. Moreover, the hook part 620 is preferably formed of a metal and a resin having high elasticity to allow the projecting part 715 to be engaged with the engaging part 725. Then, particularly in the first exemplary embodiment, the hook part 620 is formed of phosphor bronze. Therefore, the heat conduction in the hook part 620 is to be enhanced. In addition, in order that the hook part 620 keeps the electro-optical device fixed to the frame part 610, at least parts of them are necessarily contacted with the hook part 620, such as the projecting part 715 and the engaging part 725. Furthermore, particularly in the first exemplary embodiment, the hook part 620 is thoroughly contacted with the dust-proof substrate 400 as shown in FIG. 8.

As described above, the electro-optical panel 500 is housed in the internal space of the frame part 610, the engaging parts 725 are engaged with the projecting parts 715 to fix the hook part 620 to the frame part 610, and then it is packaged in the packaging case 601.

Moreover, in the case of the packaging case-encased electro-optical device shown in FIGS. 4 to 8, it is acceptable that the side where the projection light enters is "the front side" shown in FIG. 4, that is, the frame part 610 side. Alternatively, "the rear side" shown in FIG. 6, that is, the hook part 620 side is acceptable.

Figure 9:
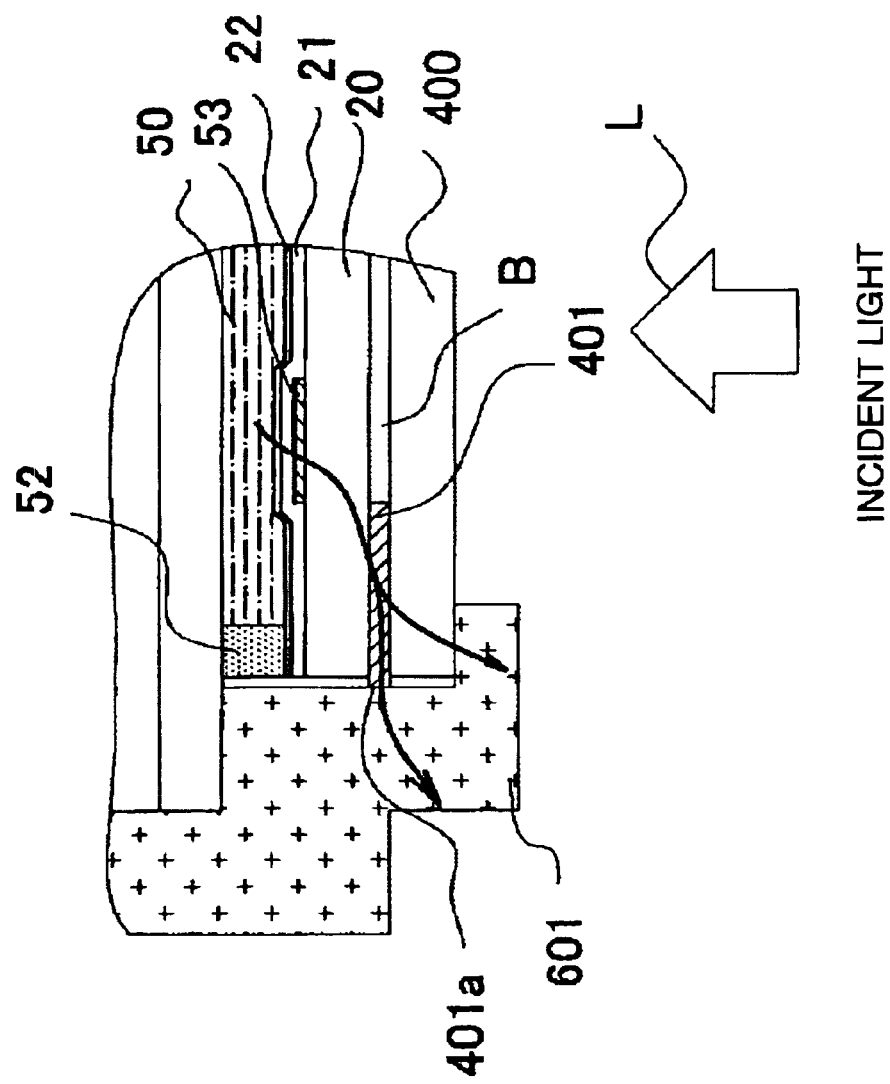
FIG. 9 is an enlarged cross-sectional view illustrating a portion inside a circle denoted by CR shown in FIG. 8.

Next, the structure particularly relating to the effect to reduce or prevent temperature rise in the packaging case-encased electro-optical device thus configured is described with reference to FIG. 9. FIG. 9 is an enlarged cross-sectional view illustrating a portion inside a circle denoted by CR shown in FIG. 8.

In the enlarged view shown in FIG. 9, the counter substrate 20, the dust-proof substrate 400 on the counter substrate 20 side, the frame light blocking film 53 formed over the counter substrate 20, a ring light blocking film 401 formed on the dust-proof substrate 400, which is one example of the first light blocking film of the invention, and the packaging case 601 are partially depicted. The structure and essential effect of the counter substrate 20 and the packaging case 601 are as described above.

Particularly, the dust-proof substrate 400, the frame light blocking film 53 and the ring light blocking film 401 are described below. First, the dust-proof substrate 400 in the first embodiment is formed of sapphire. Thus, the dust-proof substrate 400 is to have a relatively greater thermal conductivity. In addition, polymer resin material B as an adhesive is interposed between the dust-proof substrate 400 and the counter substrate 20. They are bonded with the polymer resin material B.

Furthermore, the frame light blocking film 53 is disposed to have a nearly quadrilateral shape so as to define the frame area of the image display area 10a in parallel with the inner side of the sealing area as described above. In the first exemplary embodiment, the frame light blocking film 53 is particularly formed of aluminum. Therefore, the OD value can be secured even though the frame light blocking film 53 is formed to be relatively thinner. Thus, it can be formed thinner than traditional ones. More specifically, the thickness of the traditional light blocking film formed of chromium has been about 120 to 140 nm, whereas the thickness of the frame light blocking film 53 in the first exemplary embodiment can be about 95 nm.

Consequently, according to the first exemplary embodiment, the rubbing process for the alignment layer 22 on the counter electrode 21 can be preferably performed. More specifically, bumps and dips in the surface of the alignment layer 22 are formed to be smoother by the amount that the frame light blocking film 53 is made thinner, and a so-called "shadow portion" where the end of hair of buffing cloth does not reach is not generated. Therefore, according to the first exemplary embodiment, the probability to generate irregularities in the aligned state of liquid crystals in the liquid crystal layer 50 can be reduced, and thus a higher quality image can be displayed.

In addition, as shown in FIG. 2, the frame light blocking film 53 is formed to be joined to the grid-shaped light blocking film 23 formed in the image display area 10a. More specifically, when the frame light blocking film 53 and the grid-shaped light blocking film 23 are viewed altogether in plan view, they generally have the structure shown in FIG. 10. Furthermore, in FIG. 10, the inside defined by the frame light blocking film 53 corresponds to the image display area 10a, and each grid cell defined by the grid-shaped light blocking film 23 corresponds to each pixel.

Back to FIG. 9, the ring light blocking film 401 is formed to have a nearly quadrilateral shape on the dust-proof substrate 400 and along the peripheral thereof as viewed in plan view. Then, particularly in the first exemplary embodiment, the ring light blocking film 401 is formed of aluminum.

Figure 10:
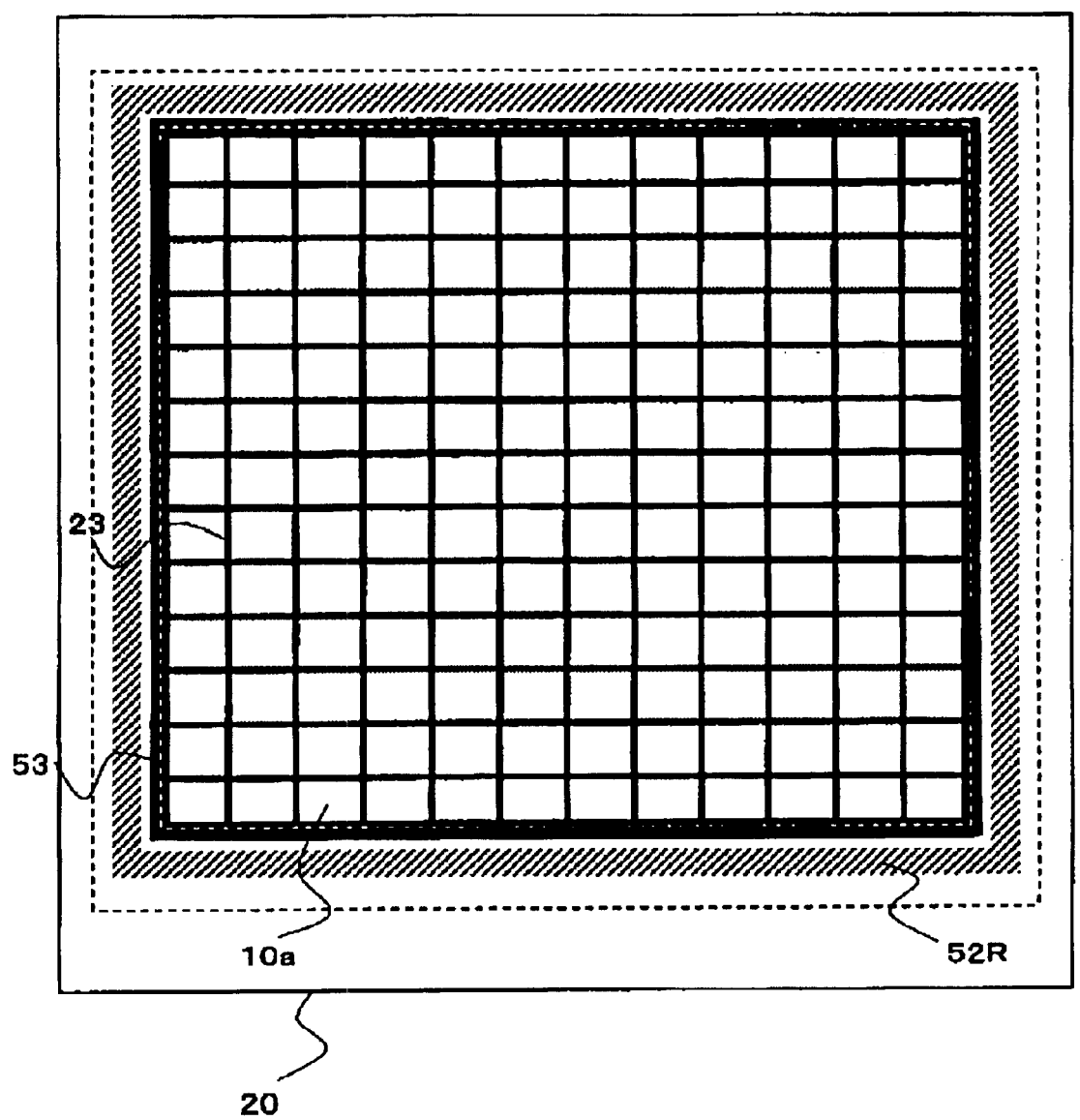
FIG. 10 is a plan view illustrating shapes of a frame light blocking film and a grid-shaped light blocking film and a sealing material forming area formed over counter substrate.

Moreover, as shown in FIG. 10, in the layout of the frame light blocking film 53 and the ring light blocking film 401, the ring light blocking film 401 is formed to surround the frame light blocking film 53 as viewed in plan view. In FIG. 10, the frame light blocking film 53 and the grid-shaped light blocking film 23 are depicted by a black portion, and the ring light blocking film 401 is illustrated as is formed in the area between a larger quadrilateral shape dashed line and a smaller quadrilateral shape dashed line depicted inside the frame light blocking film 53. In any case, the frame light blocking film 53 and the ring light blocking film 401 are formed around the dust-proof substrate 400 and the counter substrate 20 as containing the shape to rim them. On the other hand, in the first exemplary embodiment, the sealing material 52 is formed so as to nearly correspond to the shape of the ring light blocking film 401 as viewed in plan view. More specifically, when the electro-optical device, in which the dust-proof substrate 400 is not bonded, is viewed in plan view, the sealing material 52 is formed so as to cover the outer periphery of the shape of the frame light blocking film 53 (refer to the dashed area denoted by sign 52R (sealing material forming area) in FIG. 10).

Consequently, even when the sealing material 52 contains a photo curable resin and needs to undergo the curing process by irradiating light from the light source side of the counter substrate 20, that is, by irradiating the light toward the front surface of the paper in FIG. 10, the light for the curing process easily reaches the sealing material 52 without being blocked by the frame light blocking film 53. In this manner, according to the first exemplary embodiment, first, the curing process for the sealing material 52 can be performed without problems. In addition to this, further in the first exemplary embodiment, the curing process for the sealing material is completed and then the dust-proof substrate 400 is bonded. Consequently, the ring light blocking film 401 is disposed so as to conceal the sealing material 52. More specifically, the frame light blocking film 53 is formed relatively smaller beforehand in order to perform the curing process for the sealing material effectively. However, on this account, the portion not covered with the light blocking film (that is, the sealing material forming area 52R) is to be covered with the ring light blocking film 401. Therefore, as a whole, the areas of the light blocking films are increased. In this manner, according to the first exemplary embodiment, even though the frame light blocking film 53 is formed relatively smaller, the cooperative reflection effect of the ring light blocking film 401 and the frame light blocking film 53 (described below) can be obtained eventually. Thus, the effect to reduce or prevent the temperature rise in the electro-optical device will not be adversely affected.

In addition, as apparent from FIG. 10, the frame light blocking film 53 and the ring light blocking film 401 in the first exemplary embodiment are formed so that the outer rim of the former is partially overlapped with the inner rim of the latter as viewed in plan view. Therefore, according to the first exemplary embodiment, the incident light does not unnecessarily reach the inside of the electro-optical device, and the generation of the stray light therein can be reduced or suppressed.

In the packaging case-encased electro-optical device of the first exemplary embodiment thus configured, the following effect and advantage to reduce or prevent the temperature rise in the electro-optical panel 500 will be exerted. First, the dust-proof substrate 400 is disposed and the frame light blocking film 53 and the ring light blocking film 401 are disposed. Therefore, the effect and advantage to prevent the temperature rise is exerted by the separate components. More specifically, first in FIG. 9, incident light L enters the electro-optical panel 500, and then the temperature of the electro-optical device rises to a certain extent. However, the dust-proof substrate 400 is formed of sapphire having a relatively greater thermal conductivity as described above. Thus, the dust-proof substrate 400 exerts the effect to efficiently absorb heat conducted through the polymer resin material B interposed between the counter substrate 20 and the dust-proof substrate 400. More specifically, the dust-proof substrate 400 serves as a heat sink for the electro-optical device. In this manner, the dust-proof substrate 400 exerts the effect to directly absorb the heat accumulated inside the electro-optical device, and properly reduces or prevents the temperature rise.

Furthermore, the frame light blocking film 53 and the ring light blocking film 401 exert the effect to reflect the incident light L. Therefore, the action that the incident light L excessively enters the electro-optical panel 500 and is converted to heat can be reduced or suppressed. Particularly in the first exemplary embodiment, the light blocking films 53 and 401 are formed of aluminum have 80 or greater of light reflectance. Thus, the effect is exerted highly effectively. Moreover, in the first exemplary embodiment, the grid-shaped light blocking film 23 is formed so as to be joined to the frame light blocking film 53 (see FIG. 10), and thus the area viewed in plan view is relatively increased. Therefore, the light reflection effect is exerted more effectively, and the temperature rise in the electro-optical device can be prevented effectively. Even though such an increase in the area occurs, the grid-shaped light blocking film 23 of the first embodiment simply exerts a preferable effect to reduce or prevent light mixture between pixels in the image display area 10a, and will not cause a negative effect such that images are darkened. As described above, the frame light blocking film 53 and the ring light blocking film 401 do not allow the incident light L to excessively enter the electro-optical panel 500, and reduce or prevent the temperature rise.

Then, further in the first exemplary embodiment, in addition to the individual effects to prevent temperature rise by each of the components, the following effect and advantage will be exerted. More specifically, as shown in FIG. 9, the heat generated from the electro-optical panel 500 is dissipated outside through the heat conducting path including the frame light blocking film 53, the counter substrate 20, the ring light blocking film 401, the dust-proof substrate 400 and the packaging case 601. At this time, the frame light blocking film 53 and the ring light blocking film 401, the dust-proof substrate 400, and the packaging case 601 are formed of aluminum, sapphire, and a material containing aluminum or magnesium, respectively. They all have a relatively greater thermal conductivity. Therefore, both the heat absorption from the electro-optical device and the heat dissipation of the packaging case 601 to outside are to be performed efficiently. In this connection, the thermal conductivities of aluminum, sapphire and magnesium are aboum, sapphire·k), about 42 (W/m·k) and about 62 to 72 (W/m·k), respectively; each of them shows a relatively greater value. Therefore, in the first exemplary embodiment, the separate components configuring each part of the heat conducting path can perform passing and conducting heat without problems, and serve a great role in reducing or suppressing the temperature rise in the electro-optical device.

As compared with this, for example, silica, traditionally configuring the dust-proof substrate, has a thermal conductivity of about 1.35 (W/m·k), neoceram has about 1.8 (W/m·k), and PPS, traditionally configuring the packaging case 601, has a thermal conductivity of about 0.42 (W/m·k); they all show a relatively smaller value. Therefore, the heat conducting effect and the effect to reduce or prevent the temperature rise in the electro-optical panel 500 by them has a certain limit, showing that it is greatly different from the first exemplary embodiment.

Furthermore, particularly in the first embodiment, an end face 401*a* of the ring light blocking film 401 is disposed so as to be contacted with the inner surface of the packaging case 601. Consequently, the ring light blocking film 401 on the dust-proof substrate 400 directly receiving incident light is brought into contact with the packaging case 601 having the greatest thermal capacity among the separate components. Thus, the heat conducting effect is exerted more effectively, and it can be expected to effectively exert the effect to reduce or prevent the temperature rise in the electro-optical device. Moreover, in the first exemplary embodiment, the dust-proof substrate 400 and the packaging case 601 contact each other as shown in FIG. 9. Therefore, this also effectively exerts the heat conducting effect and the effect to prevent the temperature rise in the electro-optical device.

Further in the first exemplary embodiment, the hook part 620 to keep the frame part 610 fixed to the electro-optical device is disposed as a part of the packaging case 601. The hook part 620 is formed of phosphor bronze, and the hook part 620, the frame part 610 and the electro-optical panel 500 have portions to necessarily contact each other as the projecting part 715 and the engaging part 725. In addition, particularly in the first exemplary embodiment, the hook part 620 is formed to be thoroughly contacted with the dust-proof substrate 400 as described with reference to FIG. 8. Thus, the hook part 620 is to configure a part of the another specific heat conducting path different from the specific heat conducting path considered above. Therefore, the heat conduction from the electro-optical panel 500 to the packaging case 601 is formed to be realized through a plurality of paths in a kind.

Accordingly, heat dissipation is performed more surely, and the temperature rise in the electro-optical panel 500 can be reduced or prevented more effectively.

Furthermore, in the first exemplary embodiment, the hook part 620 and the dust-proof substrate 400 were formed to thoroughly contact each other as described above, but the invention is not limited to this form. For example, as shown in FIGS. 11(*a*) to 11(*c*) illustrating enlarged views of a portion inside a circle denoted by sign Q shown in FIG. 7, various forms can be selected in the forms of contacting the hook part 620 with the dust-proof substrate 400. First, as described above, FIG. 11(*a*) is the form of thoroughly contacting the hook part 620 with the dust-proof substrate 400. According to this, the heat conduction therebetween is performed significantly smoothly, and thus this portion can function highly effectively as the heat conducting path. Next, in FIG. 11(*b*), a bend part 620*a* is disposed in the surface of the hook part 620 facing to the dust-proof substrate 400, and the form is configured in which only a part of the surface is contacted with the surface of the dust-proof substrate 400. Even in this case, the portion to contact can function highly effectively as the heat conducting path. In addition, particularly in this form, the portion presses the dust-proof substrate 400, which allows the hook part 620 to exert the effect to fix the dust-proof substrate 400 to the electro-optical panel 500 more effectively (see an arrow in the drawing). This is because the bend part 620*a* can exert the action like a spring. Furthermore, in some cases, the form is acceptable that the portion to contact between the hook part 620 and the dust-proof substrate 400 is not disposed and a suitable resin material 621 is filled in the space therebetween, as shown in FIG. 11(*c*). Even in this form, the heat conducting path between the hook part 620 and the dust-proof substrate 400 is to be formed through the resin material 621. In addition to this, the resin material 621 is not necessarily filled in the space. In any case, when the hook part 620 is not directly contacted with the dust-proof substrate 400 in this manner, the advantage that the cell gap between a pair of substrates configuring the electro-optical device has to be kept constant can be obtained more excellently.

As described above, various forms can be configured in the forms of contacting the hook part 620 with the dust-proof substrate 400 in the invention. However, in order to enhance the function as the heat conducting path, FIG. 11(*a*) may be most preferable, followed by, in order, FIGS. 11(*b*) and 11(*c*) (in addition, these forms can be considered that the area of the portion to contact is between FIGS. 11(*a*) and 11(*b*) and is between FIGS. 11(*b*) and 11(*c*). However, in view of the demand that the cell gap has to be constant, FIG. 11(*a*) may be most difficult to realize it. Configuring any one of the forms shown in FIGS. 11(*a*) to 11(*c*) can be properly determined in consideration of such various circumstances.

In addition to this, in the first exemplary embodiment, the grid-shaped light blocking film 23 shown in FIG. 10 can be considered to further reinforce the function as the heat conducting path. More specifically, the heat absorption from the counter substrate 20 is performed throughout the portion where the grid-shaped light blocking film 23 is formed. Thus, the heat absorption is to be performed more efficiently. Then, the heat thus absorbed is passed through the ring light blocking film 401 and the packaging case 601, and dissipated outside as described above.

In this manner, in the first embodiment, the individual effects to reduce or prevent the temperature rise in the electro-optical panel 500 can be obtained based on the existence of the separate components such as the dust-proof substrate 400, the frame light blocking film 53 and the ring light blocking film 401. In addition to this, they combine and relate to each other and the separate components form the heat conducting path, and thus the advantage to reduce or prevent the temperature rise in the electro-optical panel 500 can be exerted beyond the effect and advantage by simple combination.

Furthermore, a plurality of the specific heat conducting paths can be considered such as the path reaching the packaging case 601 through the hook part 620, or the path reaching the packaging case 601 starting from the grid-shaped light blocking film 23 joined to the frame light blocking film 53, including the basic path of the frame light blocking film 53, the dust-proof substrate 400, the ring light blocking film 401 and the packaging case 601, in the above. The "heat conducting path" in the invention is a concept that includes all of them.

(Second Exemplary Embodiment of the Packaging Case-Encased Electro-Optical Device Having the Effect to Reduce or Prevent Temperature Rise)

Figure 12:
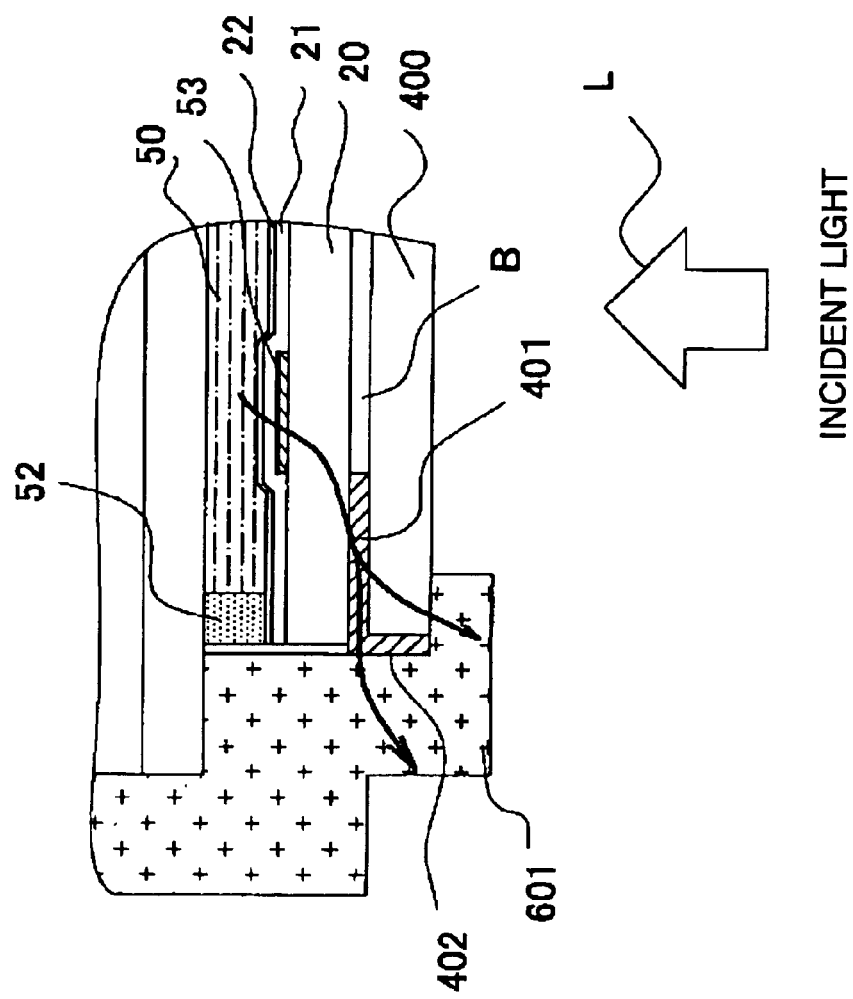
FIG. 12 is an enlarged cross-sectional view illustrating a portion inside a circle denoted by the CR shown in FIG. 8, relating to one form of a second exemplary embodiment different from FIG. 9.
Figure 13:
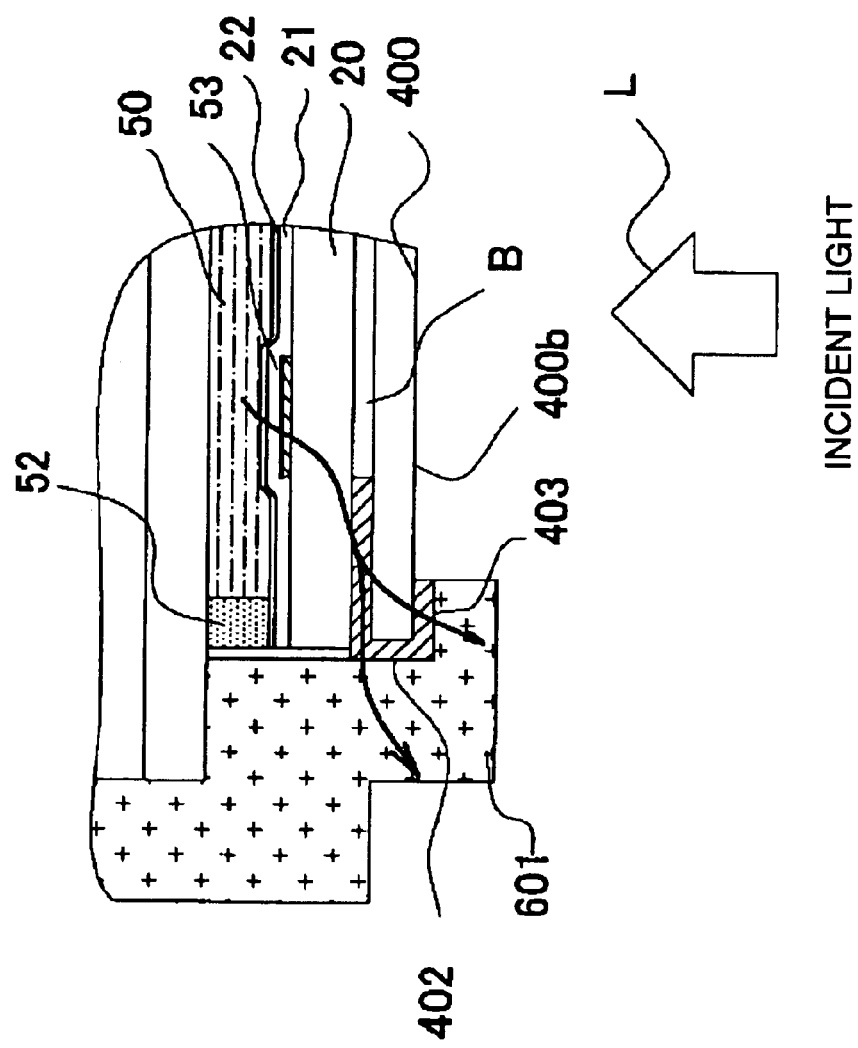
FIG. 13 is an enlarged cross-sectional view illustrating a portion inside a circle denoted by the CR shown in FIG. 8, relating to another form of the second exemplary embodiment different from FIG. 12.

A second exemplary embodiment of the invention is described below with reference to FIGS. 12 and 13. Here, FIGS. 12 and 13 are enlarged cross-sectional views illustrating a portion inside a circle denoted by the CR shown in FIG. 8 as similar to FIG. 9, but the forms are shown that a ring light blocking film 401 is somewhat varied from that shown in FIG. 9. In addition, in the second exemplary embodiment, the structure and basic effect and advantage of an electro-optical device and a packaging case 601 are the same as those in the first exemplary embodiment. Thus, hereafter, the description of the overlapping points is omitted or simplified properly, and only the features in the second exemplary embodiment are mainly described.

In FIG. 12, on the end face of a dust-proof substrate 400, an end face light blocking film 402 is formed so as to be joined to a ring light blocking film 401. It is preferable to form the end face light blocking film 402 of aluminum as similar to the ring light blocking film 401, for example. Then, as shown in FIG. 12, it shows that the area contacting with a packaging case 601 is increased by the area of the end face light blocking film 402 as compared with FIG. 9 when the ring light blocking film 401 and the end face light blocking film 402 are viewed altogether. Consequently, the heat conduction from the former to the latter is performed smoothly, and the function of the heat conducting path is further reinforced.

Furthermore, in FIG. 13, on a surface 400*b* (the lower surface in FIG. 13) of a dust-proof substrate 400 where a ring light blocking film 401 is not formed, a backside light blocking film 403 is formed so as to be joined to the ring light blocking film 401 and an end face light blocking film 402, as further advanced from FIG. 12. It is preferable to form the backside light blocking film 403 of aluminum as similar to the ring light blocking film 401, for example. Then, it is shown that the area contacting with the packaging case 601 is increased by the areas of the end face light blocking film 402 and the backside light blocking film 403 as compared with FIG. 9, and by the area of the backside light blocking film 403 as compared with FIG. 12, when the ring light blocking film 401, the end face light blocking film 402 and the backside light blocking film 403 are viewed altogether. Accordingly, the heat conduction from the former to the latter is performed more smoothly, and the function of the heat conducting path is further reinforced.

(Third Exemplary Embodiment of the Packaging Case-Encased Electro-Optical Device Having the Effect to Reduce or Prevent Temperature Rise)

Figure 14:
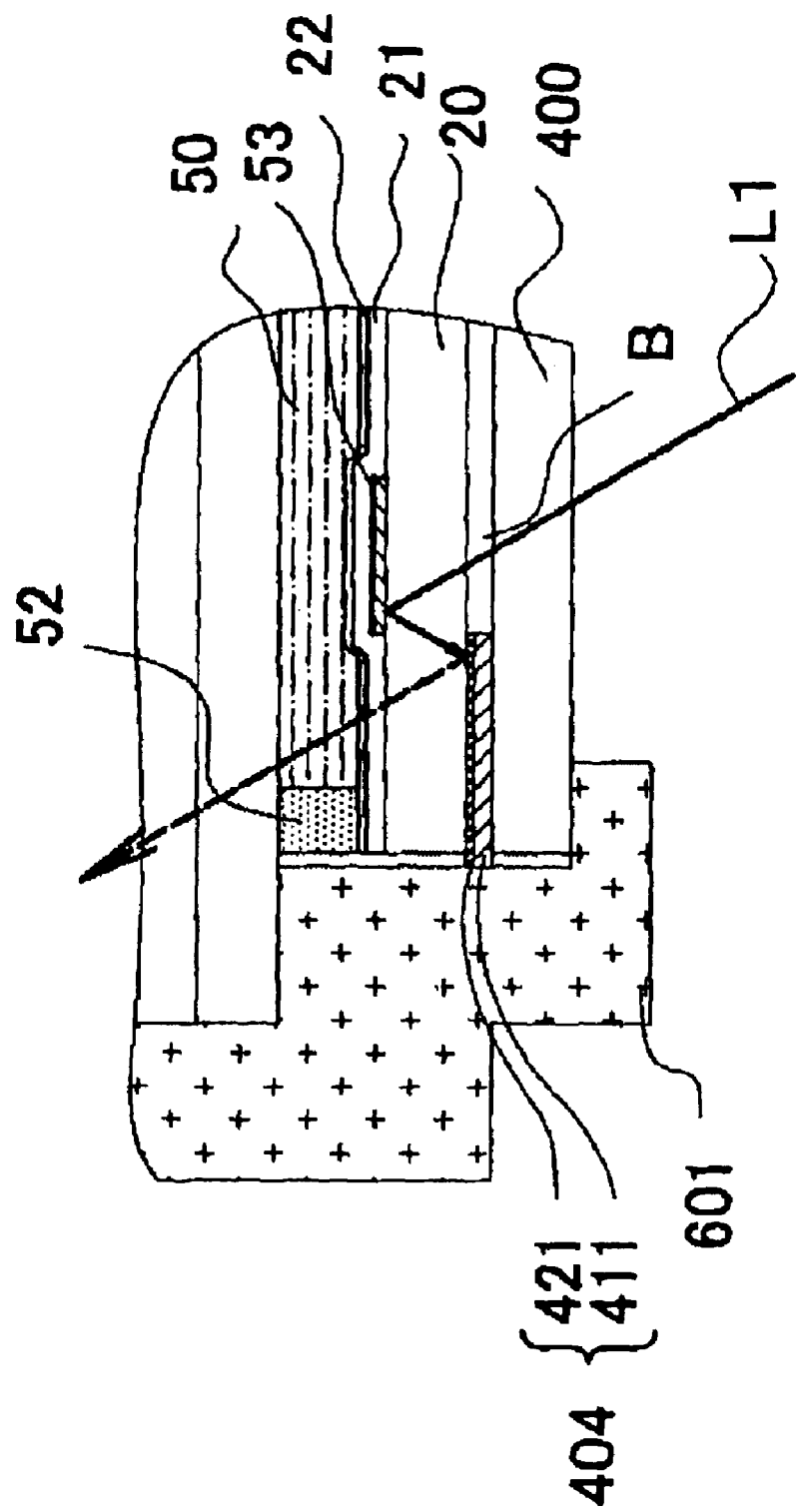
FIG. 14 is an enlarged cross-sectional view illustrating a portion inside a circle denoted by the CR shown in FIG. 8, relating to one form of a third exemplary embodiment different from FIG. 9.
Figure 15:
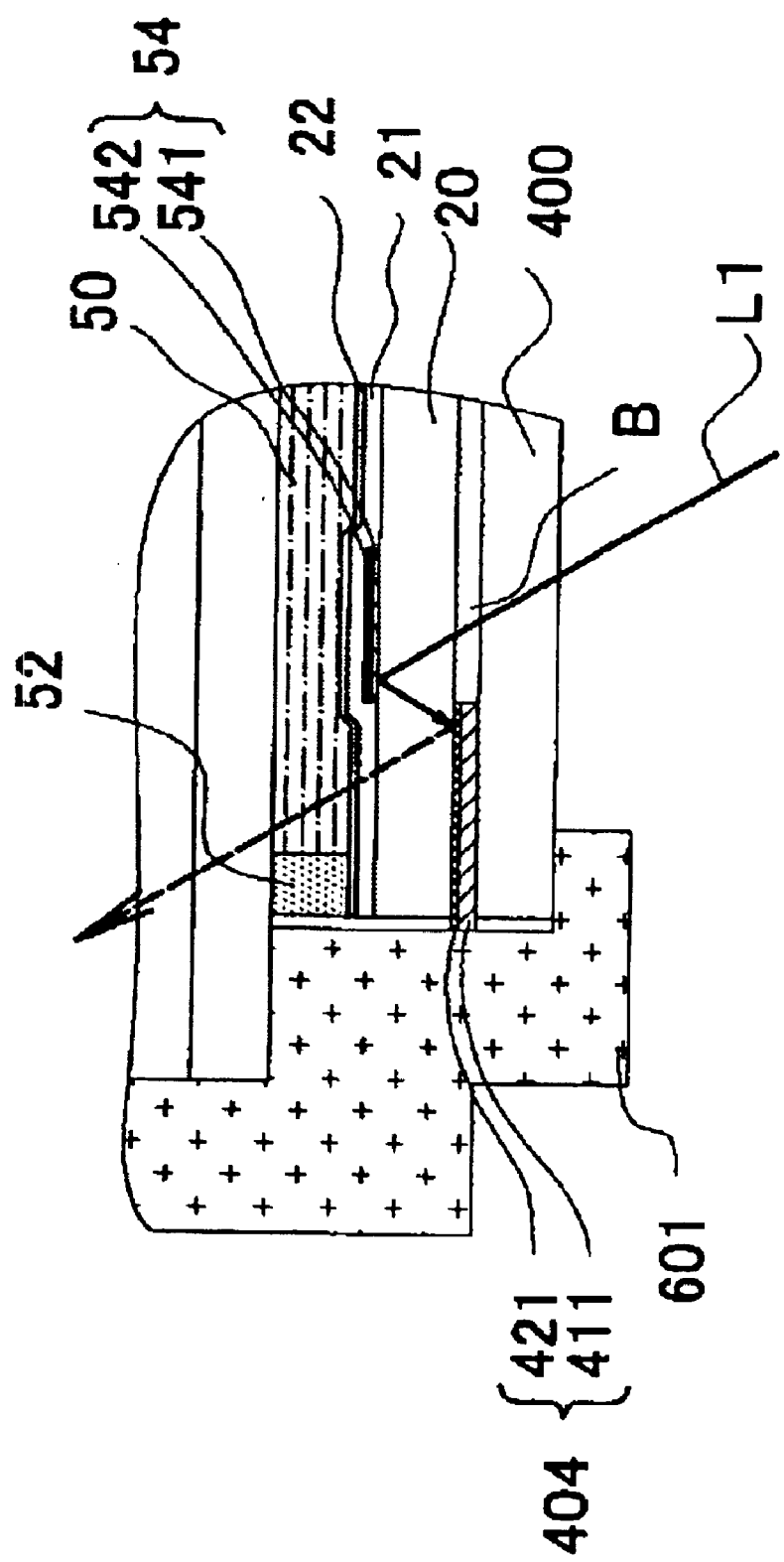
FIG. 15 is an enlarged cross-sectional view illustrating a portion inside a circle denoted by the CR shown in FIG. 8, relating to another form of the third exemplary embodiment different from FIG. 14.

Hereafter, a third exemplary embodiment of the invention is described below with reference to FIGS. 14 and 15. FIGS. 14 and 15 are enlarged cross-sectional views illustrating a portion inside a circle denoted by the CR shown in FIG. 8, as similar to FIG. 9, but the forms are shown that a ring light blocking film and a frame light blocking film are somewhat varied from those shown in FIG. 9. In addition, in the third exemplary embodiment, the structure and basic effect and advantage of an electro-optical device and a packaging case 601 are the same as those in the first exemplary embodiment. Thus, hereafter, the description of the overlapping points will be properly omitted or simplified, and only the features of the third exemplary embodiment will be mainly described.

In FIG. 14, a ring light blocking film 404 has a multilayer structure of an aluminum film 411 and a $Cr_2O_3$ film 421. The aluminum film 411 is disposed as a layer on the light source side, that is, on the incoming light side, and the $Cr_2O_3$ film 421 is disposed as a layer on the opposite side thereof. Therefore, for example, in the case where incident light L1 obliquely incoming is reflected by a frame light blocking film 53 formed on an counter substrate 20 and then it reaches the opposite side of a dust-proof substrate 400 seen from the light source as shown in FIG. 14, the incident light L1 is absorbed in the backside of the ring light blocking film 404 (that is, the surface on the opposite side of the surface facing on the light source. It is the same in regard to "a ring light blocking film 401" and "the frame light blocking film 53"), that is, in the $Cr_2O_3$ film 421. When the ring light blocking film 404 is formed of only aluminum, the incident light is reflected like a dashed line as shown in FIG. 14, and thus the stray light occurs inside the electro-optical device. The present invention is different in this point. More specifically, according to the structure shown in FIG. 14, the generation of the stray light can be reduced or suppressed, and a higher quality image can be displayed. Furthermore, the form of utilizing the $Cr_2O_3$ film has been described above, but the configuration including an alumina ($Al_2O_3$) film is acceptable instead of this.

In FIG. 15, in addition that a ring light blocking film 404 having the above mentioned multilayer structure is provided, a frame light blocking film 54 has a multilayer structure of an aluminum film 541 and a chromium film 542. The aluminum film 541 is disposed as a layer on the light source side, that is, on the incoming light side, and the chromium film 542 is disposed as a layer on the opposite side thereof. Accordingly, it is apparent that the effect and advantage nearly similar to the above are exerted. More specifically, for example, the light having reached the inside of the electro-optical device is reflected on the backside of the frame light blocking film 54, that is, on the chromium film 542, and thus the generation of the stray light can be reduced or suppressed inside the electro-optical device. It is acceptable to use chromina ($Cr_2O_3$) instead of the chromium film 542. Moreover, in addition that the frame light blocking film 54 is formed into the multilayer structure, it is of course acceptable that the grid-shaped light blocking film 23 shown in FIGS. 2 and 10 is formed into a multilayer structure.

As described above, according to the third exemplary embodiment, the stray light, which is occurred by the internal scattering of the incident light L, is not occurred. Thus, a higher quality image can be displayed.

The invention is not limited to the above exemplary embodiments. It can be modified properly within the teachings of the invention readable from the scope of claims and specification, or within the scopes consistent with the idea, and electro-optical devices and electronic devices with such modifications are of course included in the technical scope of the invention.

What is claimed is:

1. A packaging case-encased electro-optical device, comprising:
    an electro-optical device where projection light from a light source enters an image display area, the electro-optical device including a pair of substrates;
    a dust-proof substrate disposed on at least one of a light incident plane and a light emitting plane of the electro-optical device;
    a first light blocking film formed on the dust-proof substrate;
    a second light blocking film formed on at least one of the pair of substrates; and
    a packaging case to hold at least a part of a peripheral area in a periphery of the image display area in the electro-optical device and housing the dust-proof substrate by having sides arranged at at least two sides of the dust-proof substrate, the packaging case including an opening that exposes therethrough the image display area of the electro-optical device, the second light blocking film, the first light blocking film, the dust-proof substrate and the packaging case configuring a heat conducting path.

2. The packaging case-encased electro-optical device according to claim 1, at least two of the second light blocking film, the first light blocking film, the dust-proof substrate and the packaging case contacting each other.

3. The packaging case-encased electro-optical device according to claim 2, the first light blocking film and the packaging case contacting each other.

4. The packaging case-encased electro-optical device according to claim 2,
    the dust-proof substrate and the packaging case contacting each other, and
    at least one of the first light blocking film, and the second light blocking film, and the packaging case, contacting each other.

5. The packaging case-encased electro-optical device according to claim 1, the packaging case being formed of a material containing at least one of magnesium and aluminum.

6. The packaging case-encased electro-optical device according to claim 1, the dust-proof substrate being formed of sapphire.

7. The packaging case-encased electro-optical device according to claim 1, an end face light blocking film being further formed on an end face of the dust-proof substrate so as to be joined to the first light blocking film.

8. The packaging case-encased electro-optical device according to claim 7, a backside light blocking film being further formed on a surface of the dust-proof substrate where the first light blocking film is not formed, so as to be joined to the first light blocking film and the end face light blocking film.

9. The packaging case-encased electra-optical device according to claim 1, the first light blocking film being formed of aluminum.

10. The packaging case-encased electro-optical device according to claim 9, the first light blocking film having a multilayer structure of a layer formed of aluminum on the light source side and a layer formed of oxide film on an opposite side thereof.

11. The packaging case-encased electro-optical device according to claim 10, the oxide film containing a chromina ($Cr_2O_3$) film.

12. The packaging case-encased electra-optical device according to claim 1, the second light blocking film being formed of aluminum.

13. The packaging case-encased electra-optical device according to claim 12, the second light blocking film having a multilayer structure of a layer formed of aluminum on the light source side and a layer formed of chromium or chromina ($Cr_2O_3$) on an opposite side thereof.

14. The packaging case-encased electra-optical device according to claim 1, at least one of the first light blocking film and the second light blocking film being formed in a grid shape as viewed in plan view.

15. The packaging case-encased electra-optical device according to claim 1, further comprising a sealing material interposed between the pair of substrates configuring the electra-optical device for bonding the pair of substrates,
    a shape of the second light blocking film including a closed curve along a perimeter of the substrate placed on the light source side,
    a shape of the first light blocking film being a closed curve along a perimeter of the dust-proof substrate, the closed curve including a shape surrounding the second light blocking film, and
    the sealing material being formed so as to be covered with the first light blocking film as viewed in plan view.

16. The packaging case-encased electro-optical device according to claim 15, the first light blocking film and the second light blocking film being formed so as to partially overlap each other as viewed in plan view.

17. A packaging case-encased electro-optical device, comprising:
    an electro-optical device where projection light from a light source enters an image display area;
    a dust-proof substrate disposed on at least one of a light incident plane and a light emitting plane of the electro-optical device;
    a first light blocking film formed on the dust-proof substrate;
    a second light blocking film formed on at least one of a pair of substrates, one substrate placed on a light source side and the other substrate, configuring the electro-optical device;
    a packaging case to hold at least a part of a peripheral area in a periphery of the image display area in the electro-optical device and housing the electro-optical device and the dust-proof substrate, the second light blocking film, the first light blocking film, the dust-proof substrate and the packaging case configuring a heating conducting path; and
    a hook to keep the electro-optical device fixed to the packaging case, the hook configuring a part of the heat conducting path.

18. The packaging case-encased electro-optical device according to claim 17, the hook being formed of phosphor bronze.

19. The packaging case-encased electro-optical device according to claim 1, further comprising an intermediate layer disposed between the dust-proof substrate and the packaging case, the intermediate layer configuring a part of the heat conducting path.

20. A projection type display device, comprising:
    a light source;
    a packaging case-encased electro-optical device including:
        an electro-optical device where projection light from the light source enters an image display area, the electro-optical device including a pair of substrates;
        a dust-proof substrate disposed at at least one of a light incident plane and a light emitting plane of the electro-optical device;

a first light blocking film formed on the dust-proof substrate;

a second light blocking film formed on at least one of the pair of substrates; and a packaging case to hold at least a part of a peripheral area in a periphery of the image display area in the electro-optical device and housing the dust-proof substrate by having sides arranged at at least two sides of the dust-proof substrate, the packaging case including an opening that exposes therethrough the image display area of the electro-optical device, the second light blocking film, the first light blocking film, the dust-proof substrate and the packaging case configuring a heat conducting path;

an optical system to guide the projection light to the electro-optical device; and a projection optical system to project the projection light emitted from the electro-optical device.

21. A packaging case-encased electro-optical device, comprising:

an electro-optical device with an image display area irradiated with projection light from a light source;

a dust-proof substrate disposed on one of a light incident plane and a light emitting plane of the electro-optical device, the dust-proof substrate having a plate shape with a broad surface and a narrow surface, the narrow surface having a smaller surface area than the broad surface;

a light blocking film formed on at least one of a pair of substrates;

a packaging case to hold at least a part of a peripheral area of the image display area in the electra-optical device and housing the electro-optical device and the dust-proof substrate; and a hook that engages with the packaging case and that has a surface that faces the broad surface of the dust-proof substrate, the light blocking film, the dust-proof substrate, the packaging case, and the hook configuring a heat conducting path.

22. A packaging case-encased electro-optical device according to claim 21, wherein the hook contacts the broad surface of the dust-proof substrate.

* * * * *